Patented Dec. 2, 1941

2,264,358

UNITED STATES PATENT OFFICE 2,264,358

CONDENSATION PRODUCTS OF P-HYDROXY BENZOIC ACID

Louis H. Bock, Philadelphia, Pa., assignor to Röhm & Haas Company, Philadelphia, Pa.

No Drawing. Application May 6, 1939, Serial No. 272,133

6 Claims. (Cl. 260—471)

This invention relates to new condensation products of p-hydroxy-benzoic acid or its derivatives with formaldehyde and strongly basic secondary amines.

In the reaction of a phenol with formaldehyde and a strongly basic secondary amine it had been reported that, when the phenol possessed acidic substituents such as sulfonic, aldehydo, or carboxyl groups, the desired condensation did not occur. In general, this appeared to be true but it is now found, contrary to this generalization, that various series of interesting new products are obtainable from para-hydroxy-benzoic acid, its salts, its esters, its acid amides and its N-substituted amides. This is all the more unexpected in view of the fact that salicylic acid and its esters and amides do not thus condense.

The condensation of p-hydroxy-benzoic acid, or its derivatives, formaldehyde and a strongly basic, non-aromatic secondary amine may be conducted in the presence or in the absence of solvents. Suitable proportions of reactants are mixed and warmed while the mixture is stirred. In place of formaldehyde there may be used one of the simple polymers of formaldehyde, such as para-formaldehyde. Such materials are, as is well known, equivalent to formaldehyde. It thus becomes possible to use anhydrous reagents, if desired, and to remove water of condensation during the course of the reaction.

The amines which react to give condensation products with formaldehyde and p-hydroxy-benzoic acid include secondary amines of the aliphatic, alicyclic, and heterocyclic series, such as dimethylamine, diethylamine, dibutylamine, diamylamine, diallylamine, methyl dodecylamine, dicyclohexylamine, morpholine, piperidine, piperazine, pyrrolidine, diethanolamine, triethylene tetramine, and the like.

Para-hydroxy-benzoic acid may be used in this condensation or any of its salts or amide or ester derivatives. The amide may be the simple acid amide or one of the substituted amides containing one or more N-substituents, such as aliphatic, alicyclic, aryl, or aryl alkyl groups. The ester group may be any desired group, such as may be obtained from aliphatic, cycloaliphatic, aromatic, alicyclic or aryl aliphatic alcohols.

When one mol of p-hydroxy-benzoic acid, or of one of its salts, ester or amide derivatives is reacted with about one mol of formaldehyde and about one mol of a secondary amine, the resulting compound has the general formula

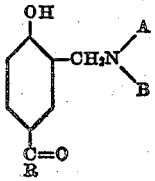

wherein R represents a member of the group consisting of hydroxyl, amino, mono-substituted amino, di-substituted amino, aryl-alkoxyl, alicyclic oxy and aliphatic oxy radicals, and A and B represent members of the group consisting of aliphatic hydrocarbon groups and divalent groups which jointly with the nitrogen form a heterocyclic ring.

Typical examples of compounds of this type are represented by the following:

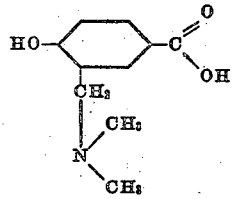

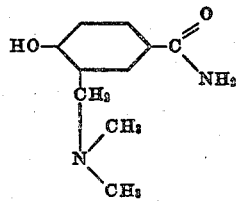

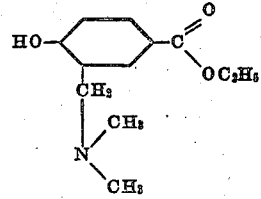

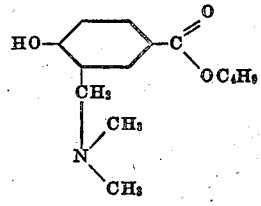

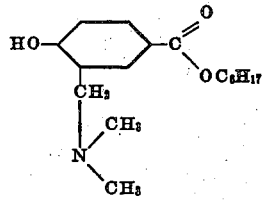

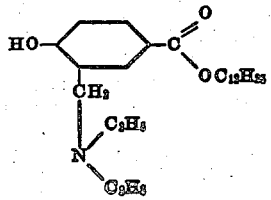

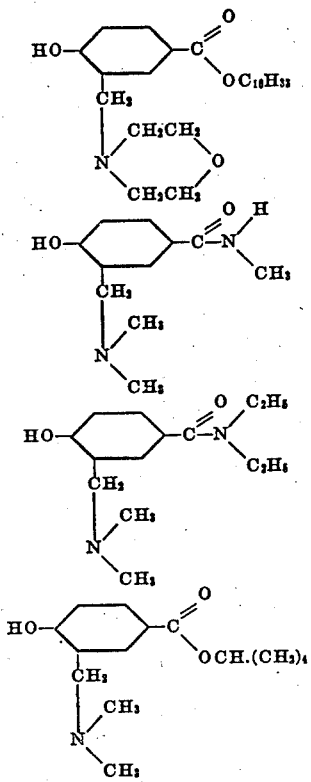

It is possible to introduce two methylene amine groups into the p-hydroxy-benzoic acid nucleus to obtain such a product as

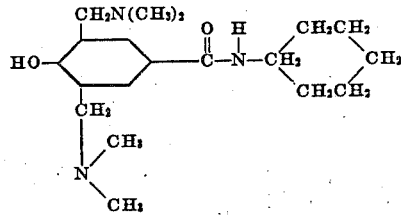

In this case at least two mol equivalents of formaldehyde and of secondary amine are reacted with one mol equivalent of p-hydroxy-benzoic acid or its derivative.

Further details of the preparation of typical condensates will be found in the following illustrative examples, in which the parts given are by weight.

*Example 1*

27 parts of p-hydroxy-benzoic acid was dissolved in 80 parts of a 25% aqueous solution of dimethylamine. To this solution was added 16 parts of a 37% aqueous solution of formaldehyde. The mixture was stirred several hours at room temperature. The product is soluble in water and is not precipitated by acidifying with hydrochloric acid. On evaporating under vacuum, a taffy-like solid was obtained which was the dimethyl ammonium salt of 3-dimethyl aminomethyl-4-hydroxybenzoic acid.

*Example 2*

A mixture consisting of 30.6 parts of dodecyl-p-hydroxy-benzoate, 30 parts of methanol, 3 parts of para-formaldehyde, and 20 parts of a 25% aqueous solution of dimethylamine was stirred 3 hours at 50° C. The reaction mixture was vacuum-evaporated to a viscous syrup, which was insoluble in water, but dissolved to form a clear solution in dilute acetic acid.

*Example 3*

A mixture consisting of 78 parts of octadecyl p-hydroxy-benzoate, 200 parts of petroleum ether (B. P. 55–90° C.), 3 parts of para-formaldeyde, and 10.5 parts of tetramethyl methylene diamine was refluxed 2 hours with a device for removing water as it distilled out. On cooling, the product crystallized and was filtered. M. P. 56–60° C. The product was insoluble in water, but formed a soapy solution in dilute acetic acid. The tetramethyl methylene diamine was prepared by reacting one mol of formaldehyde with two mols of dimethylamine.

*Example 4*

A mixture consisting of 10 parts of the cyclohexylamide of p-hydroxy-benzoic acid, 10 parts of a 30% aqueous solution of formaldehyde, 20 parts of a 25% aqueous solution of dimethylamine and 50 parts of methanol was stirred at 50° C. for 6 hours. The solution was vacuum-concentrated to liquid, which was insoluble in water but soluble in dilute acetic acid.

These new compounds may be used as wetting, emulsifying and penetrating agents. Esters or amides derived from alcohols or amines of high molecular weight are useful as detergents and emulsifying agents. Other possible uses include textile finishing agents, dye assistants, bactericides, mothicides, etc. As shown in co-pending applications Serial Nos. 248,196 and 254,884, compounds of this type are useful for insolubilizing starch and other sizing materials and, in the case of the higher molecular members, for waterproofing textile fabrics.

I claim:

1. A compound selected from the group consisting of 4-hydroxybenzoic acid and its esters in which at least one of the hydrogen atoms ortho to the phenolic hydroxyl groups is replaced by a non-aromatic tertiary aminomethyl group.

2. A compound selected from the group consisting of 4-hydroxybenzoic acid and its esters in which at least one of the hydrogen atoms ortho to the phenolic hydroxyl group is replaced by a dimethylaminomethyl group.

3. A compound of 4-hydroxybenzoic acid in which at least one of the hydrogen atoms ortho to the phenolic hydroxyl group is replaced by a non-aromatic tertiary aminomethyl group.

4. A compound of 4-hydroxybenzoic acid and its esters in which one of the hydrogen atoms ortho to the phenolic hydroxyl group has been replaced by a non-aromatic tertiary aminomethyl group.

5. A compound of 4-hydroxybenzoic acid and its esters in which the two hydrogen atoms ortho to the phenolic hydroxyl group have each been replaced by a non-aromatic tertiary aminomethyl group.

6. The octadecyl ester of 4-hydroxy-3-dimethylaminomethyl benzoic acid.

LOUIS H. BOCK.